(12) United States Patent
Lee

(10) Patent No.: US 12,725,496 B2
(45) Date of Patent: Sep. 1, 2026

(54) SMART SAFETY SYSTEM AND OPERATING METHOD THEREOF

(71) Applicants: Hyundai Motor Company, Seoul (KR); Kia Corporation, Seoul (KR)

(72) Inventor: Yongcheol Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 107 days.

(21) Appl. No.: 18/954,052

(22) Filed: Nov. 20, 2024

(65) Prior Publication Data

US 2026/0024423 A1 Jan. 22, 2026

(30) Foreign Application Priority Data

Jul. 18, 2024 (KR) ........................ 10-2024-0095231

(51) Int. Cl.

| | |
|---|---|
| ***G08B 7/06*** | (2006.01) |
| ***G06V 10/141*** | (2022.01) |
| ***G06V 10/143*** | (2022.01) |
| ***G06V 20/52*** | (2022.01) |
| ***G08B 21/02*** | (2006.01) |

(52) U.S. Cl.

CPC ............. *G08B 7/06* (2013.01); *G06V 10/141* (2022.01); *G06V 10/143* (2022.01); *G06V 20/52* (2022.01); *G08B 21/02* (2013.01); *G06V 2201/07* (2022.01)

(58) Field of Classification Search

CPC ........ G08B 7/06; G08B 21/02; G06V 10/141; G06V 20/52; G06V 10/143; G06V 2201/07

See application file for complete search history.

(56) References Cited

U.S. PATENT DOCUMENTS

2015/0035440 A1* 2/2015 Spero .................... F21S 41/143 315/153

FOREIGN PATENT DOCUMENTS

| | | | | | |
|---|---|---|---|---|---|
| CN | 115050153 A | * | 9/2022 | ............... | G08B 7/06 |
| JP | 6429424 B2 | * | 11/2018 | | |
| JP | 2022127517 A | * | 8/2022 | | |
| JP | 2024086628 A | | 6/2024 | | |
| KR | 20120049978 A | * | 5/2012 | ................ | E02F 9/26 |
| KR | 101282669 B1 | * | 7/2013 | ............. | A42B 3/006 |
| KR | 101723283 B1 | * | 4/2017 | ............... | H04N 7/18 |
| KR | 20250092363 A | * | 6/2025 | ............. | A61B 5/746 |

* cited by examiner

*Primary Examiner* — Chico A Foxx

(74) *Attorney, Agent, or Firm* — Slater Matsil, LLP

(57) ABSTRACT

A smart safety system can include an internal camera configured to photograph an inside of a workplace, a beam projector configured to illuminate a worker when the worker is located inside the workplace, a fence lighting device located in an upper end of a fence of the workplace, and an integrated controller configured to receive an image signal from the internal camera and process the image signal to determine whether the worker is located in the workplace, when the worker is located in the workplace as a result of determination, control the beam projector to illuminate the worker in a first color beam, and control the fence lighting device to emit light in a second color.

20 Claims, 8 Drawing Sheets

Figure 5:
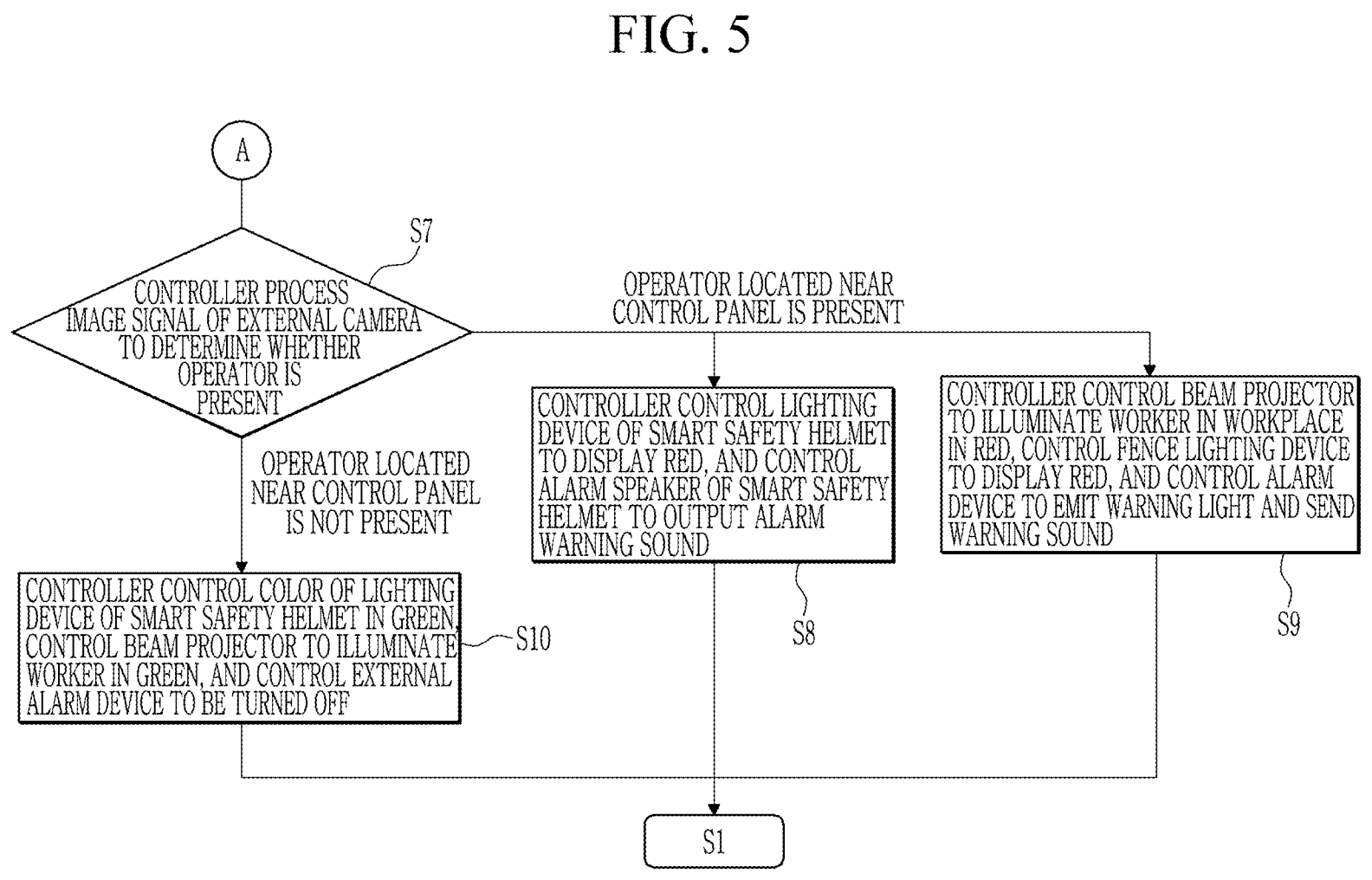

CONTROLLER PROCESS IMAGE SIGNAL OF EXTERNAL CAMERA TO DETERMINE WHETHER OPERATOR IS PRESENT

OPERATOR LOCATED NEAR CONTROL PANEL IS PRESENT

OPERATOR LOCATED NEAR CONTROL PANEL IS NOT PRESENT

S8

CONTROLLER CONTROL LIGHTING DEVICE OF SMART SAFETY HELMET TO DISPLAY RED, AND CONTROL ALARM SPEAKER OF SMART SAFETY HELMET TO OUTPUT ALARM WARNING SOUND

S9

CONTROLLER CONTROL BEAM PROJECTOR TO ILLUMINATE WORKER IN WORKPLACE IN RED, CONTROL FENCE LIGHTING DEVICE TO DISPLAY RED, AND CONTROL ALARM DEVICE TO EMIT WARNING LIGHT AND SEND WARNING SOUND

S10

CONTROLLER CONTROL COLOR OF LIGHTING DEVICE OF SMART SAFETY HELMET IN GREEN, CONTROL BEAM PROJECTOR TO ILLUMINATE WORKER IN GREEN, AND CONTROL EXTERNAL ALARM DEVICE TO BE TURNED OFF

S1

SMART SAFETY SYSTEM AND OPERATING METHOD THEREOF

CROSS-REFERENCE TO RELATED APPLICATIONS

This application claims priority to and the benefit of Korean Patent Application No. 10-2024-0095231 filed in the Korean Intellectual Property Office on Jul. 18, 2024, the entire contents of which are incorporated herein by reference.

TECHNICAL FIELD

The present disclosure relates to a smart safety system and an operating method thereof.

BACKGROUND

A considerable number of safety accidents in manufacturing factories occur when mechanical devices operate while the mechanical devices are being inspected. Safety sensors do not operate normally, operators turn off safety sensors for convenience of work during machine inspection/repair work, or other workers operate mechanical devices may be causes of accidents. In addition, it may be a cause of accidents that it is difficult for workers to recognize whether safety sensors operate normally.

As such, workers performing work in dangerous spaces or operating dangerous machine in manufacturing plants may experience accidents for a variety of reasons. As a result, workers perform work with anxiety about the occurrence of accidents, and workers' mental fatigue may accumulate. This may be a cause of another accident.

SUMMARY

An embodiment of the present disclosure can provide a safety monitoring system and method capable of ensuring safety of workers in a manufacturing factory.

According to an embodiment of the present disclosure, a smart safety system can include an internal camera configured to photograph an inside of a workplace, a beam projector configured to illuminate a worker when the worker is located inside the workplace, a fence lighting device configured to illuminate a fence of the workplace, and an integrated controller configured to receive an image signal from the internal camera and process the image signal to determine whether the worker is located in the workplace, when the worker is located in the workplace as a result of determination, control the beam projector to illuminate the worker in a first color beam, and control the fence lighting device to emit light in a second color.

The smart safety system may further include an external camera configured to photograph a certain location outside the workplace. The certain location may include a nearby region where a control panel for controlling a mechanical device inside the workplace is located. The integrated controller may receive an image signal from the external camera, process the image signal to determine whether an operator is located at the certain location, when the operator is located in the workplace as a result of determination, control the beam projector to illuminate the operator in a third color beam, and control the fence lighting device to emit light in a fourth color.

The smart safety system may further include a lighting device located in the workplace, and an alarm device configured to operate under a certain condition to output a warning sound and emit light. The integrated controller may turn on the lighting device when the worker is located in the workplace, and operate the alarm device when the worker is located at the certain positon and the worker is located in the workplace.

The smart safety system may further include a smart safety helmet worn on the worker. The smart safety helmet may include a communication device configured to provide wireless communication with the integrated controller, a safety helmet lighting device, an alarm speaker, and a controller configured to control operations of the safety helmet lighting device and the alarm speaker. When the worker is located in the workplace, the communication device may receive a first notification from the integrated controller, and the controller can be configured to control the safety helmet lighting device to emit light in a fifth color in response to the first notification and control the alarm speaker to output an alarm sound and a voice message. The safety helmet lighting device may be located outside and/or inside the smart safety helmet.

When the worker is located in the workplace, the integrated controller may determine that the operator is located at a certain location and transmit a second notification to the communication device, and the controller may control the safety helmet lighting device to emit light in a sixth color in response to the second notification and control the alarm speaker to output the alarm sound and the voice message. The safety helmet lighting device may flicker in a different pattern instead of each of the fifth color and the sixth color.

The integrated controller may include an input/output terminal device configured to provide wired communication connections with the internal camera, the beam projector, and the fence lighting device, and a controller can be configured to process the image signal received from the internal camera to determine whether the worker is located in the workplace, when the worker is located in the workplace as a result of determination, generate a control signal for controlling the beam projector to illuminate the worker in the first color beam, and generate a control signal for controlling the fence lighting device to emit light in the second color.

The smart safety system may further include a smart safety helmet worn on the worker. The integrated controller may include a communication device configured to provide wireless communication with the smart safety helmet, and when the worker is located in the workplace as a result of determination, the controller can be configured to generate a first notification notifying this and transmit the first notification to the smart safety helmet through the communication device.

The smart safety system may further include a lighting device located in the workplace, the input/output terminal device may provide a wired communication connection with the lighting device, and the controller may provide a control signal for turning on the lighting device when the worker is located in the workplace as a result of determination.

The smart safety system may further include an external camera configured to photograph a certain location outside the workplace, and an alarm device configured to operate under a certain condition to output a warning sound and emit light. The certain location may include a nearby region in which a control panel for controlling a mechanical device inside the workplace is located, and the input/output terminal device may provide a wired communication connection between the lighting device and the alarm device. The controller may receive an image signal from the external camera, process the image signal to determine whether an operator is located at the certain location, and generate a control signal for operating the alarm device when the worker is located in the workplace as a result of determination and the operator is located at the certain location.

According to an embodiment of the present disclosure, an operating method of a smart safety system can include generating a first image signal by photographing an inside of a workplace by an internal camera, receiving the first image signal from the internal camera and determining whether a worker is located in the workplace based on the received first image signal by an integrated controller, when the worker is not detected in the workplace as a result of the determining, controlling a lighting device provided in the workplace to be turned off and controlling a fence lighting device in a first color by the integrated controller, and when the worker is detected in the workplace as a result of the determining, controlling the lighting device to be turned on, controlling the fence lighting device in a second color, and transmitting a control signal for interrupting an input according to a button operation of a control panel of the workplace to the control panel by the integrated controller.

The operating method may further include, when wireless communication between a smart safety helmet worn on the worker and the integrated controller is not connected, controlling a safety helmet lighting device of the smart safety helmet to emit light in a third color, and when the worker is detected in the workplace as a result of the determining, controlling the safety helmet lighting device in a fourth color by the integrated controller.

The operating method may further include, when the worker is detected in the workplace as a result of the determining, generating a second image signal by photographing a certain location outside the workplace by an external camera, receiving the second image signal from the external camera and determining whether an operator is present by processing the received second image signal by the integrated controller, and when the operator is present as a result of the determining whether the operator is present, controlling the safety helmet lighting device in a fifth color and controlling an alarm speaker of the smart safety helmet to output an alarm warning sound by the integrated controller.

The operating method may further include, when the operator is present as a result of the determining whether the operator is present, controlling a beam projector to illuminate the worker in the workplace in a sixth color, controlling the fence lighting device in the workplace to display a seventh color, and controlling an alarm device in the workplace to emit warning light and send a warning sound by the integrated controller.

The smart safety system according to an embodiment of the present disclosure may notify workers working in dangerous spaces that the current situation is safe. This may allow workers to relieve anxiety about dangerous spaces. The smart safety system may inform the operator that workers are currently working in dangerous spaces, thereby preventing workers from operating mechanical devices in hazardous spaces. The smart safety system may inform current workers when mechanical devices operate. Current workers may recognize mechanical device operations and avoid accidents.

BRIEF DESCRIPTION OF THE DRAWINGS

FIGS. 4 and 5 are flowcharts illustrating a control operation of an integrated controller according to an embodiment of the present disclosure.

DETAILED DESCRIPTION OF ILLUSTRATIVE EMBODIMENTS

Figure 1:
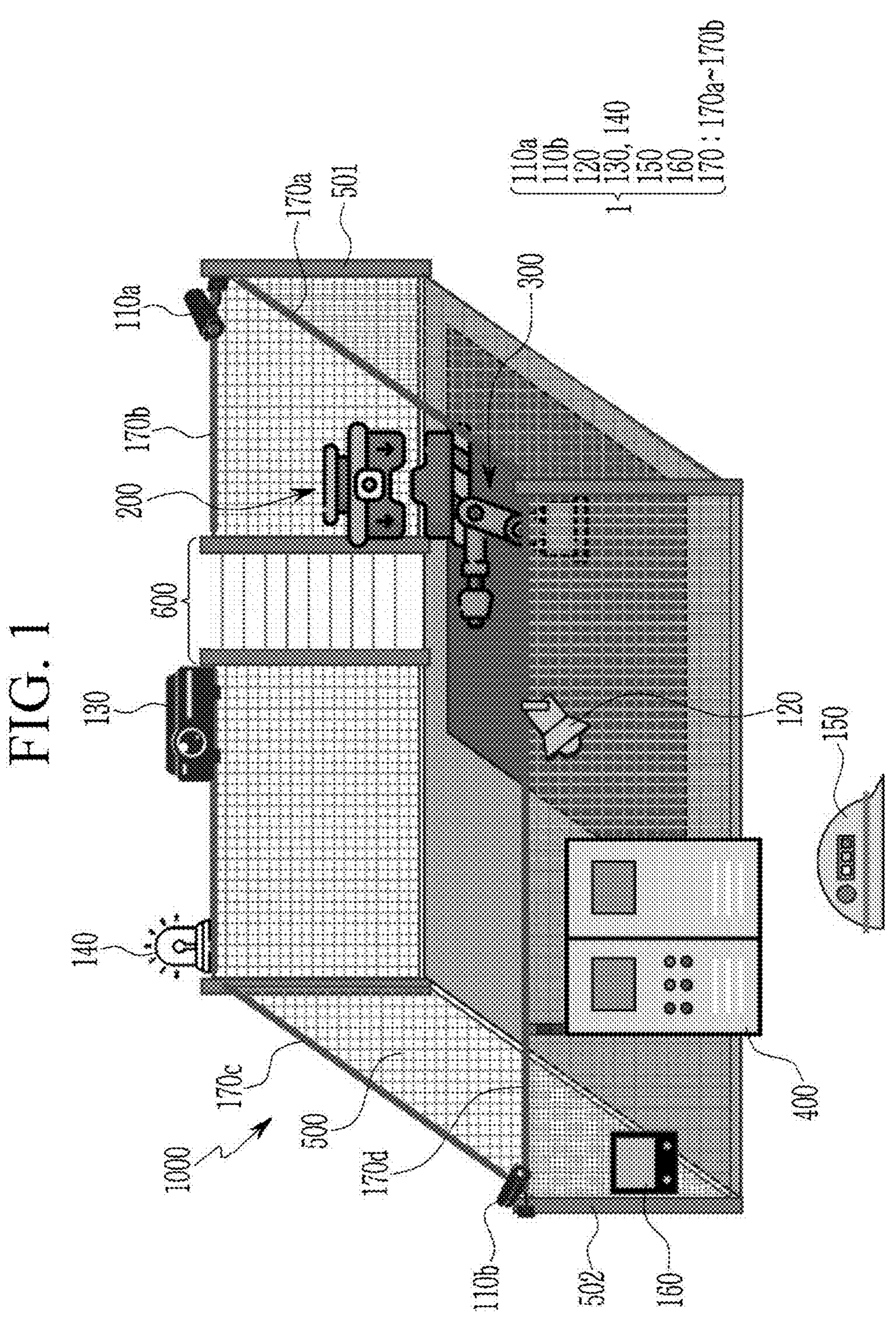
FIG. 1 is a perspective view schematically illustrating a part of a manufacturing plant to which a smart safety system according to an embodiment of the present disclosure is applied.

FIG. 1 is a perspective view schematically illustrating a part of a manufacturing plant to which a smart safety system according to an example embodiment of the present disclosure is applied.

FIG. 1 illustrates a workplace 1000 in which one of a plurality of processes is performed in a manufacturing factory. In the workplace 1000, a press 200, a robot 300, and a control panel 400 provided to operate the press 200 and the robot 300 may be installed, for example. In the workplace 1000, a laser curtain 600 and a safety fence 500 may be installed. The safety fence 500 may spatially separate machines that may cause an accident, such as the press 200 and the robot 300 of the workplace 1000. The laser curtain 600 may detect entry and exit of a worker into and from the workplace 1000. In FIG. 1, the control panel 400 may be located outside the workplace 1000.

A smart safety system 1 applied to the workplace 1000 may include an internal camera 110*a*, an external camera 110*b*, a lighting device 120, a beam projector 130, an alarm device 140, a smart safety helmet 150, an integrated controller 160, and fence lighting devices 170: 170*a*, 170*b*, 170*c*, and 170*d*.

The internal camera 110*a* may photograph the inside of the workplace 1000 to detect a worker located inside the workplace 1000. The external camera 110*b* may detect another person located outside the workplace 1000. For example, the external camera 110*b* may photograph a nearby region of the control panel 400 to determine whether an operator is located in the nearby region of the control panel 400 controlling the press 200 and the robot 300. Each of the internal camera 110*a* and the external camera 110*b* may convert a photographed image into an image signal.

FIG. 1 illustrates that the internal camera 110*a* is attached to an upper end of a pillar 501 of the safety fence 500, but the disclosure is not necessarily limited thereto. The internal camera 110*a* may be located at a place where the inside of the workplace 1000 may be photographed. FIG. 1 illustrates that the external camera 110*b* can be attached to an upper end of a pillar 502 of the safety fence 500, but the disclosure is not necessarily limited thereto. The external camera 110*b* may be located at a place outside the workplace 1000 where a position requiring monitoring may be photographed.

The lighting device 120 may notify that a worker is working. For example, when the worker is located inside the workplace 1000, the lighting device 120 may be turned on.

The lighting device 120 may be implemented as one of various types of lighting in accordance with notification purpose of the lighting device 120, and is not necessarily limited to a specific type of lighting. The beam projector 130 may illuminate the worker located inside the workplace 1000. Another type of lighting device capable of illuminating a specific object instead of the beam projector 130 may be applied to an embodiment of the present disclosure. The alarm device 140 may include a light source that emits light and a speaker that may output sound. The alarm device 140 may inform that the operator is located near the control panel 400 with light and sound under a condition that the operator is located in the workplace 1000.

The smart safety helmet 150 may provide a notification to the worker. The integrated controller 160 may control the entire system. The fence lighting devices 170*a* to 170*d* may illuminate the safety fence 500 surrounding the workplace 1000. For example, the fence lighting devices 170*a* to 170*d* may be located on an upper end of the safety fence 500 to display an outline of the workplace 1000 to the outside. The fence lighting devices 170*a* to 170*d* may be implemented as any one of various types of lighting devices that may be mechanically coupled to the safety fence 500.

Figure 2:
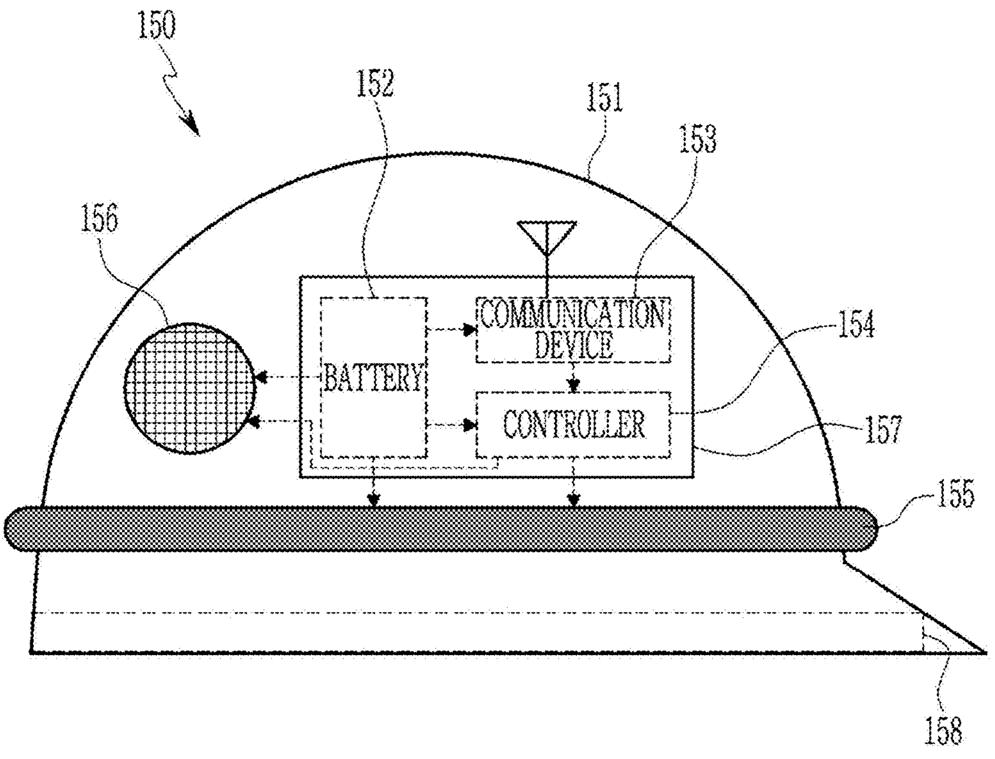
FIG. 2 is a diagram schematically illustrating a smart safety helmet according to an embodiment of the present disclosure.

FIG. 2 is a diagram schematically illustrating a smart safety helmet according to an example embodiment of the present disclosure.

As shown in FIG. 2, the smart safety helmet 150 can include a safety helmet 151, a battery 152, a communication device 153, a controller 154, a safety helmet lighting device 155, and an alarm speaker 156. The battery 152, the communication device 153, and the controller 154 are shown in dotted lines, which indicates that these components can be provided in a storage space 157 formed in an outside direction of the safety helmet 151. As shown in a dotted line in FIG. 2, a safety helmet lighting device 158 that provides the same function as the safety helmet lighting device 155 may be further provided inside the safety helmet 151, for example, inside a brim. At least one of the two safety helmet lighting devices 155 and 158 may be attached to the safety helmet 151. The safety helmet lighting device 158 may be provided inside the safety helmet 151 so that a worker may more easily recognize a current working state.

The smart safety helmet 150 may receive notification information about a situation of the workplace 1000 from the integrated controller 160 through the communication device 153. The communication device 153 may be implemented as a wireless communication device. A wireless communication method between the communication device 153 and the integrated controller 160 may be determined in consideration of a communication available distance. The notification information about the situation of the workplace 1000 may include a worker entry notification that the worker is located inside the workplace 1000 and an operator position notification that an operator is located in a nearby region of the control panel 400 when the worker is located inside the workplace 1000. The communication device 153 may transmit a received notification to the controller 154.

The controller 154 may control functions of the smart safety helmet 150. The controller 154 may generate a control signal by analyzing the notification information received from the communication device 153. The controller 154 may turn on or off the lighting device 155 and/or change a color of the safety helmet lighting device 155 and/or the safety helmet lighting device 158 according to the notification information. In the following description, the description of the safety helmet lighting device 155 may be equally applied to the safety helmet lighting device 158. For example, the controller 154 may generate a lighting control signal for controlling the color of the safety helmet lighting device 155 and provide the lighting control signal to the safety helmet lighting device 155. The safety helmet lighting device 155 may emit light of the color according to the lighting control signal. Alternatively, the safety helmet lighting device 155 may flicker in a different pattern according to the lighting control signal.

The controller 154 may generate an alarm sound signal, a voice message signal, etc. according to the notification information and transmit the alarm sound signal, the voice message signal, etc. to the alarm speaker 156. The alarm speaker 156 may output an alarm sound, a voice message, etc. according to the alarm sound signal, the voice message signal, etc. The voice message may be a message indicating that the worker is located in the workplace 1000 or a message indicating that the operator is located in the nearby region of the control panel 400.

In addition to the notification information, the controller 154 may check a communication state between the communication device 153 and the integrated controller 160, when the communication state is abnormal as a result of checking, generate a lighting control signal, an alarm sound signal, a voice message signal, etc. to display the abnormal communication state, and provide the lighting control signal, the alarm sound signal, the voice message signal, etc. to the safety helmet lighting device 155 and the alarm speaker 156.

The battery 152 may supply power necessary for operations of the communication device 153, the controller 154, the safety helmet lighting device 155, and the alarm speaker 156.

The safety helmet lighting device 155 may be implemented as a display device capable of displaying a plurality of colors. For example, the safety helmet lighting device 155 may include a plurality of light emitting diode (LED) devices representing the plurality of colors. The controller 154 may determine a color displayed by the safety helmet lighting device 155 according to a situation and adjust the color of the safety helmet lighting device 155.

For example, when communication between the communication device 153 of the smart safety helmet 150 and the integrated controller 160 is not connected to each other, the controller 154 may determine and control the color of the safety helmet lighting device 155 in yellow. The controller 154 may generate a lighting control signal indicating a yellow display and provide the lighting control signal to the safety helmet lighting device 155.

When communication between the wireless communication device 153 of the smart safety helmet 150 and the integrated controller 160 is connected to each other, the controller 154 may determine and control the color of the safety helmet lighting device 155 in blue. The controller 154 may generate a lighting control signal indicating a blue display and provide the lighting control signal to the safety helmet lighting device 155.

An entry of the worker into the workplace 1000 may be detected by the integrated controller 160, and the integrated controller 160 may transmit a worker entry notification to the wireless communication device 153. The controller 154 may receive the worker entry notification from the communication device 153 and may determine and control the color of the safety helmet lighting device 155 in green according to the worker entry notification. The controller 154 may generate a lighting control signal indicating a green display and provide the lighting control signal to the safety helmet lighting device 155.

When the operator located in front of the control panel 400 is detected by the integrated controller 160, and the integrated controller 160 transmits an operator position notification to the wireless communication device 153, the controller 154 may receive the operator position notification from the communication device 153 and determine and control the color of the safety helmet lighting device 155 in red according to the operator position notification. The controller 154 may generate a lighting control signal indicating a red display and provide the lighting control signal to the safety helmet lighting device 155. If necessary/desired/preset, the controller 154 may provide an alarm sound signal, an alarm message signal, etc. to the alarm speaker 156 to control the safety helmet lighting device 155 in red and simultaneously output an alarm warning sound or an alarm message through the alarm speaker 156.

Figure 3:
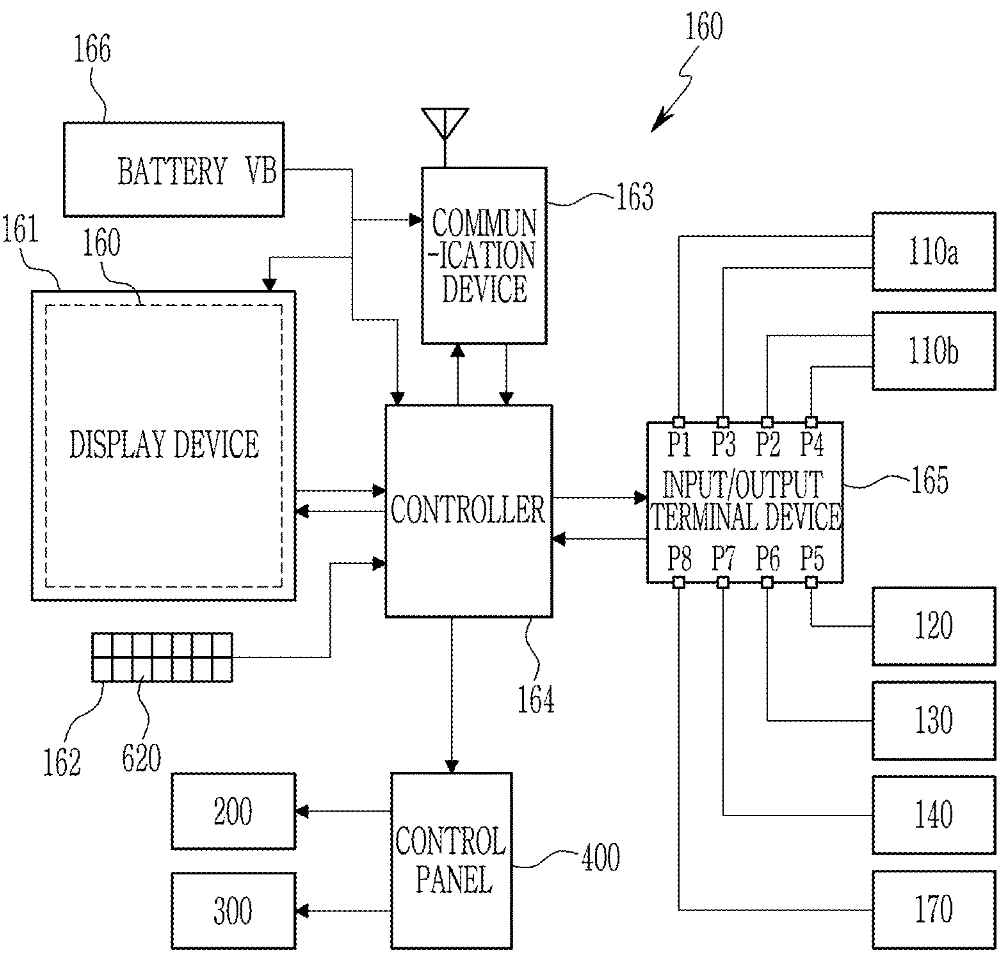
FIG. 3 is a block diagram illustrating a configuration of an integrated controller according to an embodiment of the present disclosure.

FIG. 3 is a block diagram illustrating a configuration of an integrated controller according to an example embodiment of the present disclosure.

As shown in FIG. 3, the integrated controller 160 may include a display device 161, an operation button device 162, a communication device 163, a controller 164, an input/output terminal device 165, and a battery 166.

The display device 161 may display an image signal provided from the controller 164. The controller 164 may generate an image signal for displaying an interface screen for controlling the integrated controller 160 and transmit the image signal to the display device 161. Also, the display device 161 may include a touch screen panel 610. A person who has the authority to operate the smart safety system 1 may input a control command through a touch on the touch screen panel 610. The touch screen panel 610 may detect an input touch, generate a touch input, and provide the touch input to the controller 164. The controller 164 may detect the touch input, generate input information, and perform a control operation in response to the generated input information.

The operation button device 162 may include a plurality of buttons 620, may generate a pressure input provided to each of the plurality of buttons 620, and may provide the pressure input to the controller 164. The controller 164 may detect the pressure input to generate input information, and may perform a control operation in response to the generated input information.

The input information may include a control command for the smart safety system 1, information necessary for an operation of the smart safety system 1, etc. The control command may include commands related to control of the smart safety system 1. For example, the control command for the smart safety system 1 may include a control command for controlling an operation of any of components of the smart safety system 1.

The communication device 163 may provide wireless communication between the integrated controller 160 and other components of the smart safety system 1 or between external components. The controller 164 can combine a control operation and information indicating an object to perform the control operation to generate a control signal, and transmit the control signal to the communication device 163. The communication device 163 may convert the received control signal into a wireless communication signal and transmit the wireless communication signal. The object to perform the control operation may be at least one of the components of the smart safety system 1. The communication device 163 may receive signals from the components of the smart safety system 1, other external components, etc., and transmit the received signals to the controller 164.

The input/output terminal device 165 may provide a wired communication connection between the integrated controller 160 and other components of the smart safety system 1. For example, at least some of the components of the smart safety system 1 may be connected to the input/output terminal device 165 through signal wirings, cables, etc. The input/output terminal device 165 may include a plurality of input terminals P1 and P2 and a plurality of output terminals P3 to P8. The plurality of input terminals P1 and P2 may be respectively connected to the internal camera 110*a* and the external camera 110*b*. The plurality of output terminals P3, P4, P5, P6, and P7 may be respectively connected to the internal camera 111*a*, the external camera 110*b*, the lighting device 120, the beam projector 130, and the alarm device 140.

Each of the internal/external cameras 110*a* and 110*b* may convert a photographed image into an image signal and output the image signal. The image signals of the internal/external cameras 110*a* and 110*b* may be respectively input as outputs to the input terminals P1 and P2 of the input/output terminal device 165. The controller 164 may respectively recognize the image signals input to the input terminals P1 and P2 as an image signal of the internal camera 110*a* and an image signal of the external camera 110*b*. The controller 164 may analyze each image signal to generate control signals for other components. When the control command for the internal/external cameras 110*a* and 110*b* is provided, the controller 164 may generate control signals for controlling a pan, a tilt, a zoom, etc., of the internal/external cameras 110*a* and 110*b* according to the control command.

The controller 164 may generate a plurality of control signals for respectively controlling the internal/external cameras 110*a* and 110*b*, the lighting device 120, the beam projector 130, and the alarm device 140 to respectively provide the control signals to the plurality of output terminals P3 to P7. The plurality of output terminals P3 to P7 can be respectively connected to input terminals of the internal/external cameras 110*a* and 110*b*, the lighting device 120, the beam projector 130, and the alarm device 140. Each of the internal/external cameras 110*a* and 110*b*, the lighting device 120, the beam projector 130, and the alarm device 140 may operate according to a control signal input to the input terminal.

The battery 166 may supply power necessary for an operation of the integrated controller 160. For example, the battery 166 may supply a battery voltage VB to the display device 161, the communication device 163, and the controller 164.

The controller 164 may process the image signals obtained from the internal camera 110*a* and the external camera 110*b*, and generate control signals for controlling on/off, brightness, etc. of the lighting device 120 and the fence lighting device 170 according to an image signal processing result. The controller 164 may generate a control signal for controlling a projection direction and a color of a beam of the beam projector 130 according to a position of a worker when the worker is located in the workplace 1000 according to an image signal processing result. The controller 164 may generate a control signal for controlling the alarm device 140 to output an alarm sound such as a buzzer and emit light when the worker is located in the workplace 1000 and an operator is located near the control panel 400 according to the image signal processing result.

The controller 164 may transmit the control command to the control panel 400 according to the image signal processing result. For example, the controller 164 may generate a control command for stopping operations of the press 200 and the robot 300 according to the image signal processing result and transmit the control command to the control panel 400. The control panel 400 may stop the operations of the press 200 and the robot 300 according to the control command.

The controller 164 may generate a control command for controlling the smart safety helmet 150 according to the image signal processing result and transmit the control command to the communication device 163, and the communication device 163 may transmit the control command to the communication device 153 of the smart safety helmet 150 through wireless communication. The controller 154 of the smart safety helmet 150 may turn on/off the safety helmet lighting device 155, change a color of lighting, and sound an alarm or output a voice message through the alarm speaker 156 based on the received control command.

A control operation of an integrated controller according to an example embodiment of present disclosure will be described with reference to FIGS. 4 and 5.

Figure 4:
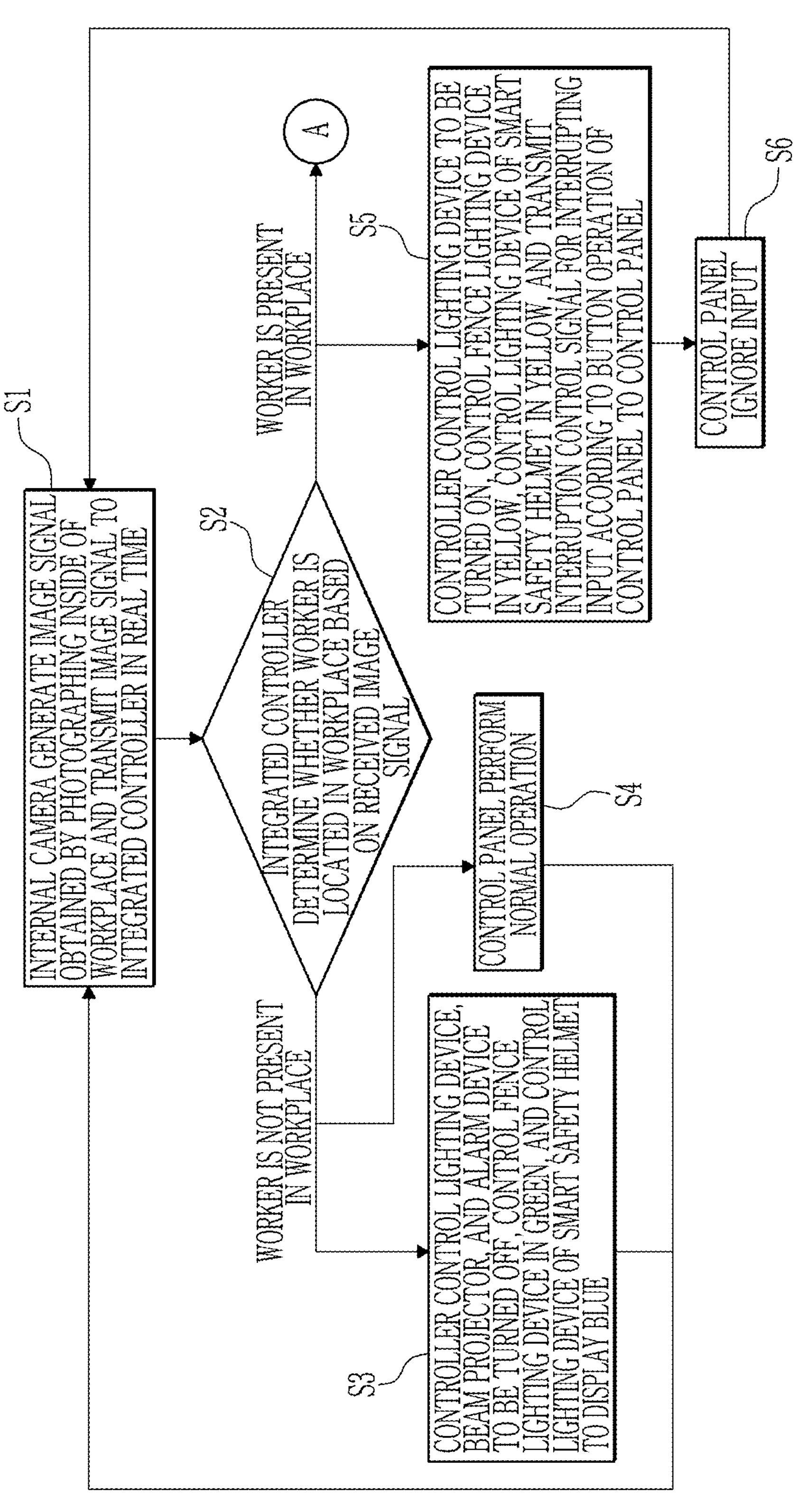

FIGS. 4 and 5 are flowcharts illustrating the control operation of the integrated controller according to an example embodiment of the present disclosure.

The internal camera 110*a* may generate an image signal obtained by photographing an inside of the workplace 1000 and transmit the image signal to the integrated controller 160 in real time (operation S1).

The integrated controller 160 may determine whether a worker is located in the workplace 1000 based on the received image signal (operation S2). For example, the controller 164 may receive an image signal of the internal camera 110*a* through the input/output terminal device 165 and process the received image signal to determine whether the worker is located. A method in which the controller 164 performs image signal processing to determine whether the worker is located in the workplace 1000 may use a known artificial intelligence object detection technology.

The known artificial intelligence object detection technology may be a technology for selectively searching for a region having a high probability of including an object through a deep learning-based region proposal network (RPN). An object detection model may be built through deep learning by the RPN such as faster region with convolution neural network (R-CNN), region-based fully convolutional network (R_FCN), faster R-CNN to which a feature pyramid network (FPN) is applied, etc. The controller 164 may include a processor implementing the object detection model built as described above. The known artificial intelligence object detection technology may be a single-step algorithm such as YOLO, a single shot multibox detector (SSD), RetinaNET, etc.

As a result of determining in operation S2, when the worker is not detected in the workplace 1000, the controller 164 may control the lighting device 120, the beam projector 130, and the alarm device 140 to be turned off, control the fence lighting device 170 in green, and control the safety helmet lighting device 155 of the smart safety helmet 150 to display blue (operation S3). When the integrated controller 160 and the smart safety helmet 150 are in a wireless communication connection state, that is, a distance between the worker wearing the smart safety helmet 150 and the integrated controller 160 is within a wireless communication possible distance, the smart safety helmet 150 may receive a control signal and display blue. Otherwise, the smart safety helmet 150 may display yellow indicating that wireless communication is not connected. The control panel 400 may perform a normal operation of generating a control command according to an input generated by a button operation of an operator (operation S4).

As a result of determining in operation S2, when the worker is detected in the workplace 1000, the controller 164 may control the lighting device 120 to be turned on, control the fence lighting device 170 in yellow, control the safety helmet lighting device 155 of the smart safety helmet 150 to display green, and transmit a control signal (hereinafter referred to as an interruption control signal) for interrupting an input according to a button operation of the control panel 400 to the control panel 400 (operation S5). The control panel 400 may ignore the input generated by the button operation according to the interruption control signal (operation S6).

As shown in FIG. 5, as a result of determining in operation S2, when the worker is detected in the workplace 1000, the controller 164 may receive the image signal from the external camera 110*b* and process the image signal to determine whether the operator is present in an image photographed by the external camera 110*b* (operation S7). At this time, the controller 164 may detect the operator located near the control panel 400 by using the object detection technology described above.

As a result of the determination in operation S7, when the operator located near the control panel 400 is present, the controller 164 may control the safety helmet lighting device 155 of the smart safety helmet 150 to display red, and control the alarm speaker 156 of the smart safety helmet 150 to output an alarm warning sound (operation S8). The controller 164 may control the beam projector 130 to illuminate the worker in the workplace 1000 in red, control the fence lighting device 170 to display red, and control the alarm device 140 to emit a warning light and send a warning sound (operation S9).

As a result of determination in operation S7, when the operator located near the control panel 400 is not present, the controller 164 may control the color of the safety helmet lighting device 155 of the smart safety helmet 150 in green, control the beam projector 130 to illuminate the worker in green, and control the external alarm device 140 to be turned off (operation Sio).

Figure 6:
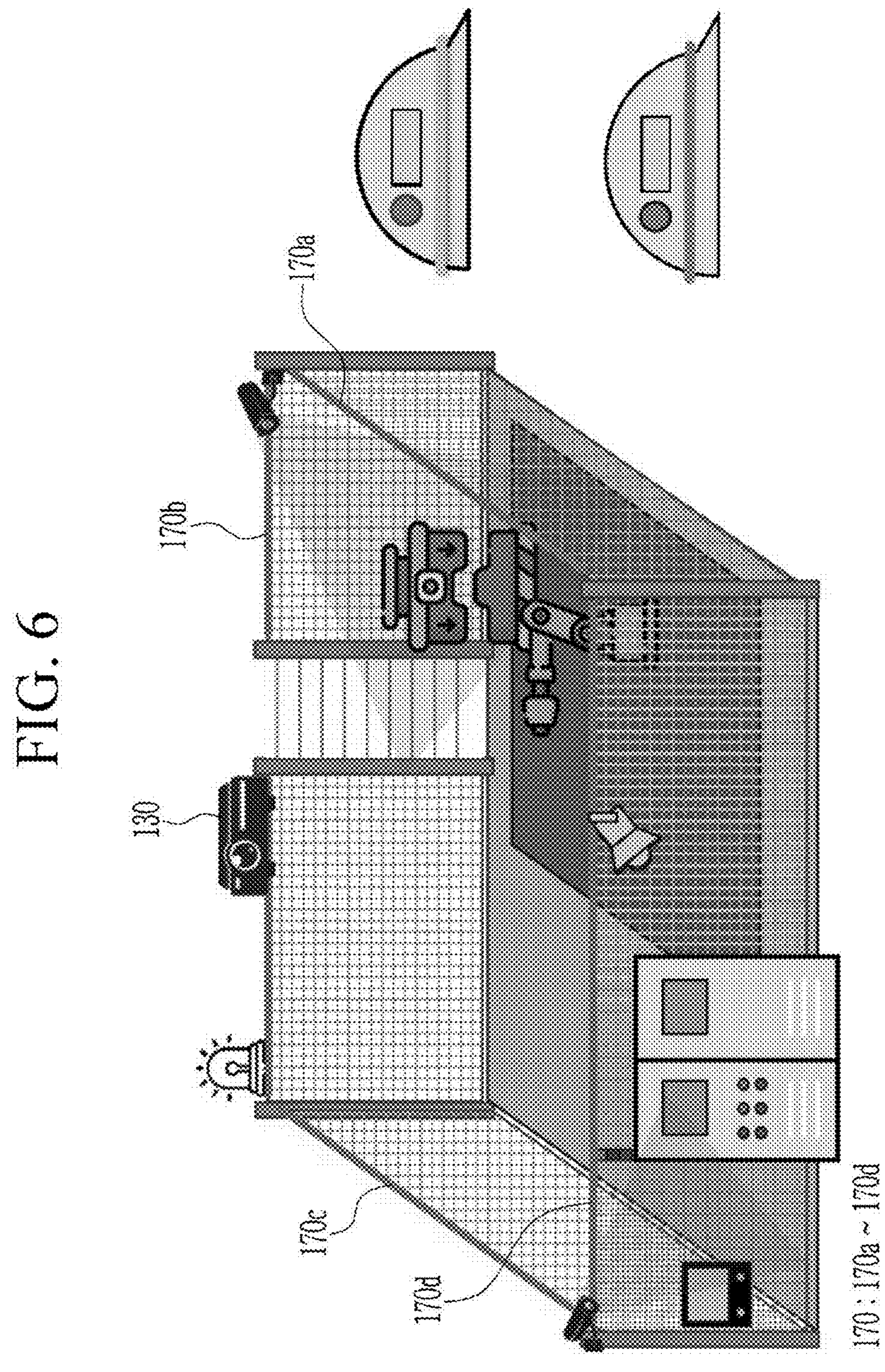
FIG. 6 is a diagram illustrating states of a workplace and a smart safety helmet controlled by an integrated stabilizer according to an embodiment of the present disclosure.

FIG. 6 is a diagram illustrating states of a workplace and a smart safety helmet controlled by an integrated stabilizer according to an example embodiment of the present disclosure.

FIG. 6 illustrates the states of the workplace and the smart safety helmet when a worker is not detected in the workplace. A color of the helmet lighting device 155 of the smart safety helmet 150 may be displayed in yellow or blue. When the smart safety helmet 150 and the integrated controller 160 are connected through wireless communication, the helmet lighting device 155 may be displayed in blue by control of the integrated controller 160. When not connected, the helmet lighting device 155 may emit light in yellow, and the alarm speaker 156 of the smart safety helmet 150 may send a warning sound for a communication failure. In addition, the integrated controller 160 may control the fence lighting device 170 to emit green light, and the fence lighting device 170 may emit green light according to control.

Figure 7:
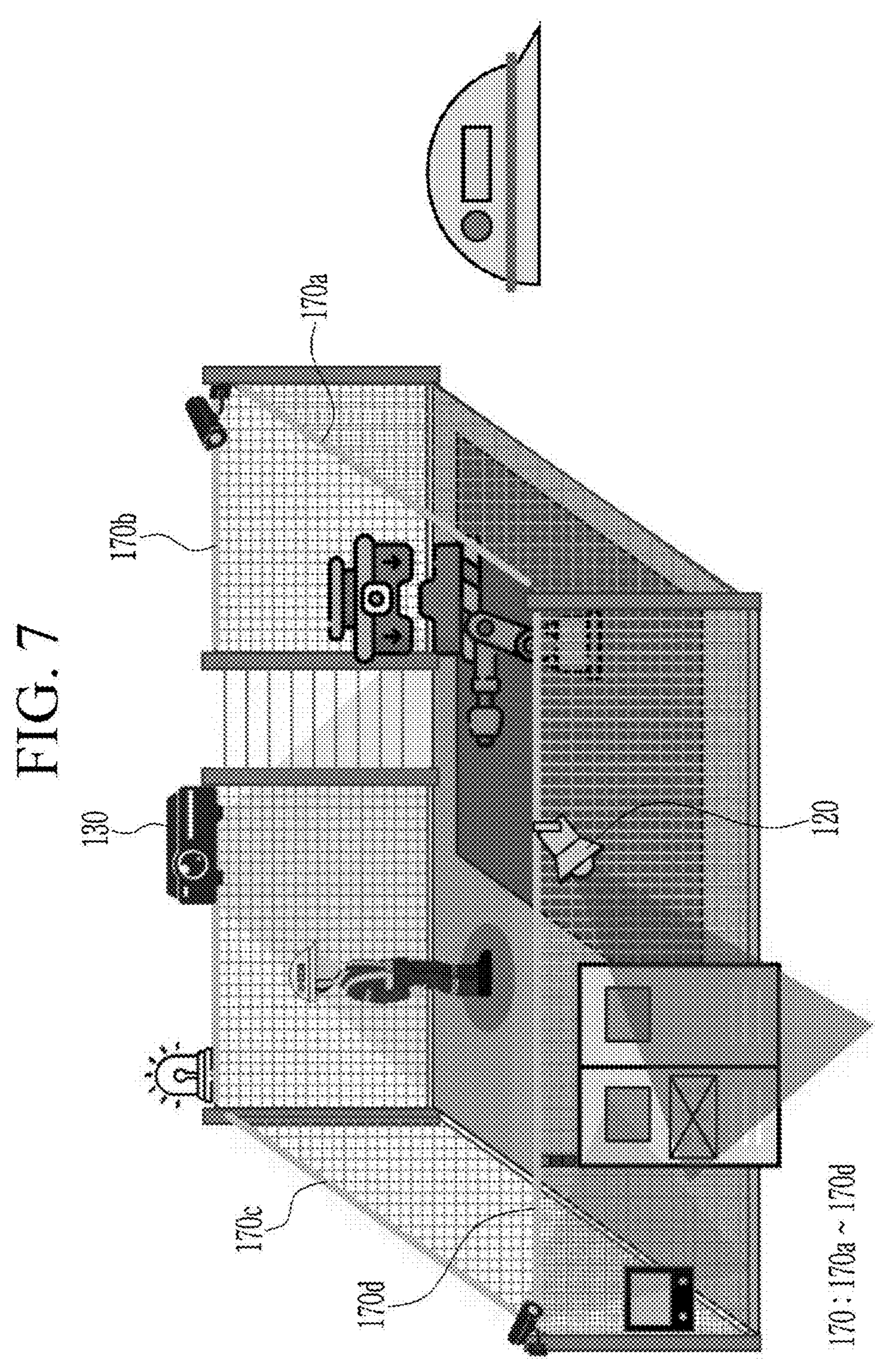
FIG. 7 is a diagram illustrating states of a workplace and a smart safety helmet controlled by an integrated stabilizer according to an embodiment of the present disclosure.

FIG. 7 is a diagram illustrating states of a workplace and a smart safety helmet controlled by an integrated stabilizer according to an example embodiment of the present disclosure.

FIG. 7 illustrates the states of the workplace and the smart safety helmet when a worker is detected in the workplace. When the integrated controller 160 recognizes the worker by using an image signal received from the internal camera

110*a*, the integrated controller 160 may transmit a control signal such that the safety helmet lighting device 155 of the smart safety helmet 150 emits green light, and the safety helmet lighting device 155 may emit green light according to the control signal. The integrated controller 160 may transmit the control signal to the beam projector 130 such that the beam projector 130 illuminates the worker in green, and the beam projector 130 may project a green beam to a positon of the worker according to the control signal. The integrated controller 160 may control the fence lighting device 170 to emit yellow light, and the fence lighting device 170 may emit yellow light according to control. The integrated controller 160 may control the lighting device 120 to emit red light, and the lighting device 120 may emit red light according to control.

Figure 8:
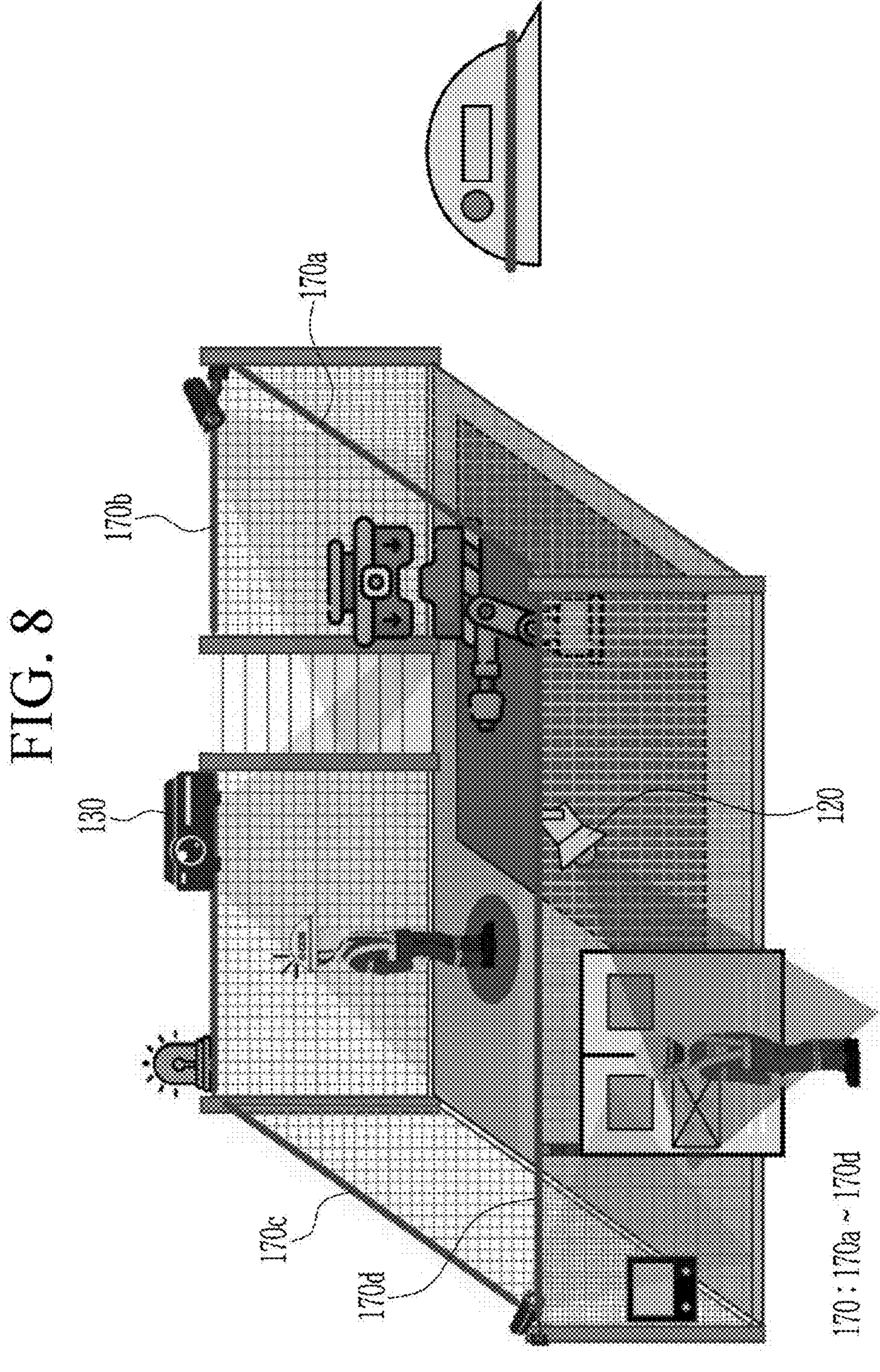
FIG. 8 is a diagram illustrating states of a workplace and a smart safety helmet controlled by an integrated stabilizer according to an embodiment of the present disclosure.

FIG. 8 is a diagram illustrating states of a workplace and a smart safety helmet controlled by an integrated stabilizer according to an example embodiment of the present disclosure.

FIG. 8 illustrates the states of the workplace and the smart safety helmet when a worker is detected in the workplace and an operator is detected near the control panel 400.

When the integrated controller 160 recognizes the worker and the operator by using image signals received from the internal and external cameras 110*a* and 110*b*, the integrated controller 160 may transmit a control signal such that the safety helmet lighting device 155 of the smart safety helmet 150 emits red light, and the safety helmet lighting device 155 may emit red light according to the control signal. The integrated controller 160 may transmit a control signal to the beam projector 130 so that the beam projector 130 may illuminate the worker in red, and the beam projector 130 may project a red beam to a position of the worker according to the control signal. The integrated controller 160 may control the fence lighting device 170 to emit red light, and the fence lighting device 170 may emit red light according to control. The integrated controller 160 may control the lighting device 120 to emit red light, and the lighting device 120 may emit red light according to control. The integrated controller 160 may operate the alarm device 140, and the alarm device 140 may output a warning sound and emit red light.

In FIGS. 6 to 8, it has been explained that the color of the safety helmet lighting device 155 of the smart safety helmet 150 is changed according to the state of the workplace, but the disclosure is not necessarily limited thereto, and the safety helmet lighting device 155 may flicker in a different pattern according to a state of each workplace.

Embodiments of the present disclosure may more effectively inform a dangerous situation by controlling a safety sensor used to protect a worker in a dangerous environment. Previously, workers could not check whether safety sensors operate normally. While workers are working without recognizing the dangerous situation, a mechanical device operates, which causes an accident to the worker. Embodiments of the present disclosure may allow the worker to check whether the safety sensor operates normally and simultaneously avoid the dangerous situation. In the case of a deep learning-based safety sensor that performs a complex operation, a system may be down due to S/W or H/W instability, and a worker of an unlearned shape may not be recognized in some cases. In contrast, in an embodiment, illumination light of a beam projector illuminates the worker with different colors according to situations, and illumination light of a smart safety helmet emits different colors according to situations, and thus, the worker may easily recognize his or her situation. Accordingly, the worker may check whether he or she is safe, avoid the dangerous situation, and prevent a safety accident.

Although example embodiments of the present disclosure have been described in detail above, scopes of the present disclosure are not necessarily limited thereto, and various modifications and improvements made by a person of an ordinary skill in the field to which the present disclosure pertains can also belong to the scopes of the present disclosure.

What is claimed is:

1. A smart safety system comprising:
- an internal camera configured to photograph an inside of a workplace;
- a beam projector configured to illuminate a worker in response to the worker being located inside the workplace;
- a fence lighting device configured to illuminate a fence of the workplace; and
- an integrated controller configured to:
  - receive a first image signal from the internal camera,
  - process the first image signal to determine whether the worker is located in the workplace,
  - in response to determining that the worker is located in the workplace, control the beam projector to illuminate the worker in a first color beam, and
  - in response to determining that the worker is located in the workplace, control the fence lighting device to emit light in a second color.

2. The system of claim 1, further comprising an external camera configured to photograph a certain location outside the workplace, wherein the certain location includes a nearby region where a control panel for controlling a mechanical device inside the workplace is located.

3. The system of claim 2, wherein the integrated controller is further configured to:
- receive a second image signal from the external camera;
- process the second image signal to determine whether an operator is located at the certain location;
- in response to determining that the operator is located in the workplace, control the beam projector to illuminate the operator in a third color beam; and
- in response to determining that the operator is located in the workplace, control the fence lighting device to emit light in a fourth color.

4. The system of claim 2, further comprising:
- a lighting device located in the workplace; and
- an alarm device configured to operate under a certain condition to output a warning sound and emit light.

5. The system of claim 4, wherein the integrated controller is further configured to:
- turn on the lighting device in response to the worker being located in the workplace; and
- operate the alarm device in response to the worker being located at a certain position and the worker being located in the workplace.

6. The system of claim 1, further comprising a smart safety helmet configured to be worn on the worker, wherein the smart safety helmet comprises:
- a communication device configured to provide wireless communication with the integrated controller;
- a safety helmet lighting device;
- an alarm speaker; and
- a safety-helmet controller configured to control operations of the safety helmet lighting device and the alarm speaker.

7. The system of claim 6, wherein the safety helmet lighting device is located outside and/or inside the smart safety helmet.

8. The system of claim 6, wherein in response to the worker being located in the workplace, the communication device is configured to receive a first notification from the integrated controller, and the safety-helmet controller is configured to control the safety helmet lighting device to emit light in a fifth color in response to the first notification and control the alarm speaker to output an alarm sound and a voice message.

9. The system of claim 8, wherein in response to the worker being located in the workplace, the integrated controller is configured to determine that the operator is located at a certain location and transmit a second notification to the communication device, and the safety-helmet controller is configured to control the safety helmet lighting device to emit light in a sixth color in response to the second notification and control the alarm speaker to output the alarm sound and the voice message.

10. The system of claim 9, wherein the safety helmet lighting device is configured to flicker in a different pattern instead of each of the fifth color and the sixth color.

11. The system of claim 1, wherein the integrated controller comprises:

an input/output terminal device configured to provide wired communication connections with the internal camera, the beam projector, and the fence lighting device; and a main controller configured to:

process the first image signal received from the internal camera to determine whether the worker is located in the workplace, in response to determining that the worker is located in the workplace, generate a first control signal for controlling the beam projector to illuminate the worker in the first color beam, and in response to determining that the worker is located in the workplace, generate a second control signal for controlling the fence lighting device to emit light in the second color.

12. The system of claim 11, further comprising a smart safety helmet configured to be worn on the worker, wherein the integrated controller includes a communication device configured to provide wireless communication with the smart safety helmet, and in response to determining that the worker is located in the workplace, the main controller is further configured to generate a first notification notifying that the worker is located in the workplace and transmit the first notification to the smart safety helmet through the communication device.

13. The system of claim 11, further comprising a lighting device located in the workplace, wherein the input/output terminal device is configured to provide a first wired communication connection with the lighting device.

14. The system of claim 13, wherein the main controller is further configured to provide a third control signal for turning on the lighting device in response to determining that the worker is located in the workplace.

15. The system of claim 11, further comprising:

an external camera configured to photograph a certain location outside the workplace; and an alarm device configured to operate under a certain condition to output a warning sound and emit light.

16. The system of claim 15, wherein the certain location includes a nearby region in which a control panel for controlling a mechanical device inside the workplace is located, wherein the input/output terminal device is configured to provide a second wired communication connection between the lighting device and the alarm device, and wherein the main controller is further configured to:

receive a second image signal from the external camera, process the second image signal to determine whether an operator is located at the certain location, and generate a fourth control signal for operating the alarm device in response to determining that the worker is located in the workplace and the operator is located at the certain location.

17. An operating method of a smart safety system, the operating method comprising:

generating a first image signal by photographing an inside of a workplace by an internal camera;

receiving the first image signal from the internal camera and determining whether a worker is located in the workplace based on the received first image signal by an integrated controller;

in response to determining that the worker is not detected in the workplace, controlling a lighting device provided in the workplace to be turned off and controlling a fence lighting device in a first color by the integrated controller; and in response to determining that the worker is detected in the workplace, controlling the lighting device to be turned on, controlling the fence lighting device in a second color, and transmitting a control signal for interrupting an input according to a button operation of a control panel of the workplace to the control panel by the integrated controller.

18. The method of claim 17, further comprising:

in response to wireless communication between a smart safety helmet worn on the worker and the integrated controller being not connected, controlling a safety helmet lighting device of the smart safety helmet to emit light in a third color; and in response to determining that the worker is detected in the workplace, controlling the safety helmet lighting device in a fourth color by the integrated controller.

19. The method of claim 18, further comprising:

in response to determining that the worker is detected in the workplace, generating a second image signal by photographing a certain location outside the workplace by an external camera;

receiving the second image signal from the external camera and determining whether an operator is present by processing the received second image signal by the integrated controller; and in response to determining that the operator is present, controlling the safety helmet lighting device in a fifth color and controlling an alarm speaker of the smart safety helmet to output an alarm warning sound by the integrated controller.

20. The method of claim 18, further comprising, in response to determining that the operator is present, controlling a beam projector to illuminate the worker in the workplace in a sixth color, controlling the fence lighting device in the workplace to display a seventh color, and controlling an alarm device in the workplace to emit warning light and send a warning sound by the integrated controller.

* * * * *